MARIA PANERAI and
GIUSEPPE PANERAI,
INVENTORS

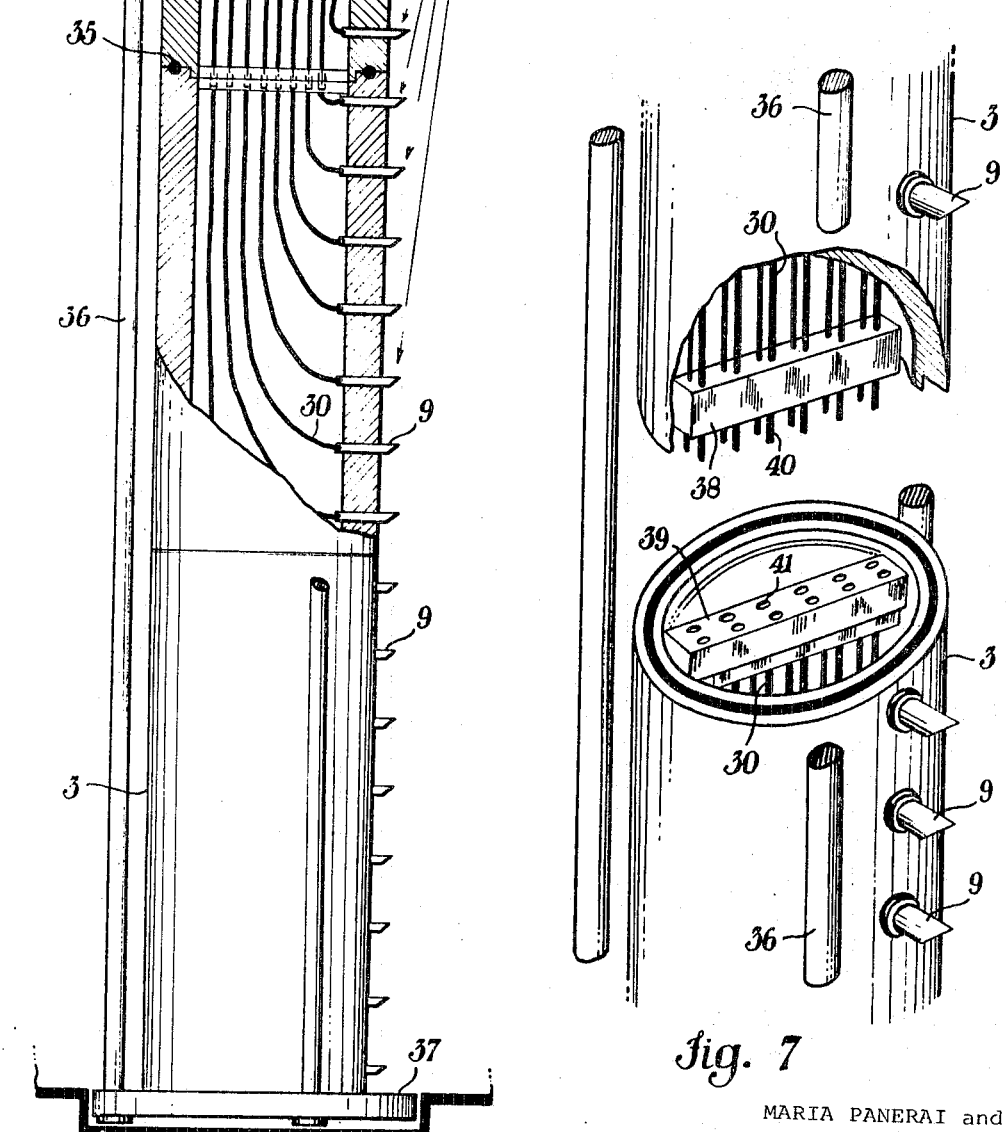

United States Patent Office 3,548,657
Patented Dec. 22, 1970

3,548,657
DEVICE FOR AN OUTSIDE DISPLAY OF THE LEVEL OF A LIQUID CONTAINED WITHIN A TANK
Maria Panerai and Giuseppe Panerai, both of 2 Piazza Galileo Ferraris, Florence, Italy
Filed Nov. 19, 1968, Ser. No. 777,084
Claims priority, application Italy, Nov. 30, 1967, 41,102/67, Patent 819,856; Mar. 27, 1968, 35,858/68; May 2, 1968, 36,692/68; May 15, 1968, 37,000/68; Oct. 9, 1968, 40,337/68
Int. Cl. G01f 23/00
U.S. Cl. 73—293      6 Claims

ABSTRACT OF THE DISCLOSURE

A device for an outside display of the level of a liquid contained within a tank, particularly for inflammable liquids, characterized by a plurality of optical light transmitting elements located at vertical intervals within the side wall of a vertically disposed liquid tight cylindrical hollow element anchored to the bottom of and projecting from the top of the tank, and said elements projecting into said tank and cylindrical element, apparatus associated with the top of the tank for sending a light beam on said optical elements, a corresponding plurality of feeler elements within said cylindrical element and connected with each optical element to detect the light changes on said reflecting elements in dependence upon the level of the liquid, and further apparatus external of said tank and coupled to the feeler elements for transducing said light variations on said light-transmitting elements into a visible display corresponding to the metering liquid levels in said tank.

---

The present invention relates to a device for an outside indication of the level of any liquid, particularly an inflammable liquid, contained within a tank.

As it is known, various kinds of gauges destined to indicate the level of a liquid contained within a tank have been devised and embodied. At the present status of the art, said devices can be subdivided into two groups and particularly: the gauges having a mechanical operation, i.e. based on the displacement of a floater or other analogous movable member, and the electrically operated ones which make use the change of an electric signal proportional to the liquid level. Also systems including both mechanical members and electrical constructive components exist.

The problem of the metering operation becomes very severe when within the tank, due to operative needs, internal pressures occur having a relevant value, i.e. such to damage the movable members of the device, or when the tank is destined to contain inflammable liquids, which of course prevent any kind of electric circuit from being used, for evident safety reasons.

The purpose of this invention is that of solving the above stated problem, embodying a level gauge which has no movable members, which includes no electrical contact or other component incompatible with the presence of inflammable liquids and which can be used in tanks having any sizes or shapes.

According to this invention a device is provided comprising in combination, a set of optical elements located at vertical intervals inside the tank, means for illuminating said optical elements, a set of feeler members suitable to detect the changes of light on said reflecting elements, depending upon the liquid level and means for transducing said light changes into a visive indication corresponding to the desired metering.

Preferably, said optical elements consist of a set of prisms projecting from a hermetically sealed cylindrical probe immersed into the tank illuminated by a light beam coming from one or more sources, located inside the tank or on one or more walls thereof. According to one embodiment, said feeler elements consist of a set of photocells contained within said probes associated to the various prisms and connected to the display board.

In a further embodiment, said feeler elements consist of a second array of optical reflection prisms, associated to the previously cited prisms, contained within the probe or destined to transmit the light changes to said photocells or to said illuminometer, located at the top of the probe outside of the tank.

In another embodiment, a device is provided including a set of optical probes located inside the tank, having different lengths, and each of which consists of a pair of rods of transparent material, mating along one of their lateral faces, and provided at their bottom end a double reflection prism, suitable to send back the light rays to a contrary direction to that of input.

One of the rods of each pair is struck by a beam of light rays axialwise oriented, while the other rod is provided with a final prism destined to supply an output luminous information when said double lower prism is not dipped into the liquid.

Always according to this invention, each optical probe consists of two portions of a light pipe having any cross-section and a rectilinear development, the first portion of which (input portion) goes from the luminous source to the double prism, and the second portion (output portion) goes from the said double prism to the output prism.

This invention will now be described with reference to the attached drawings showing by way of non limitative examples some preferred embodiments of the invention itself.

In the drawings:

FIG. 5 is a view similar to FIG. 2, showing a further variant;

FIG. 6 is a view similar to FIG. 2 showing a further variant;

FIG. 7 is a perspective detail view, concerning the device of FIG. 6;

Figure 1:
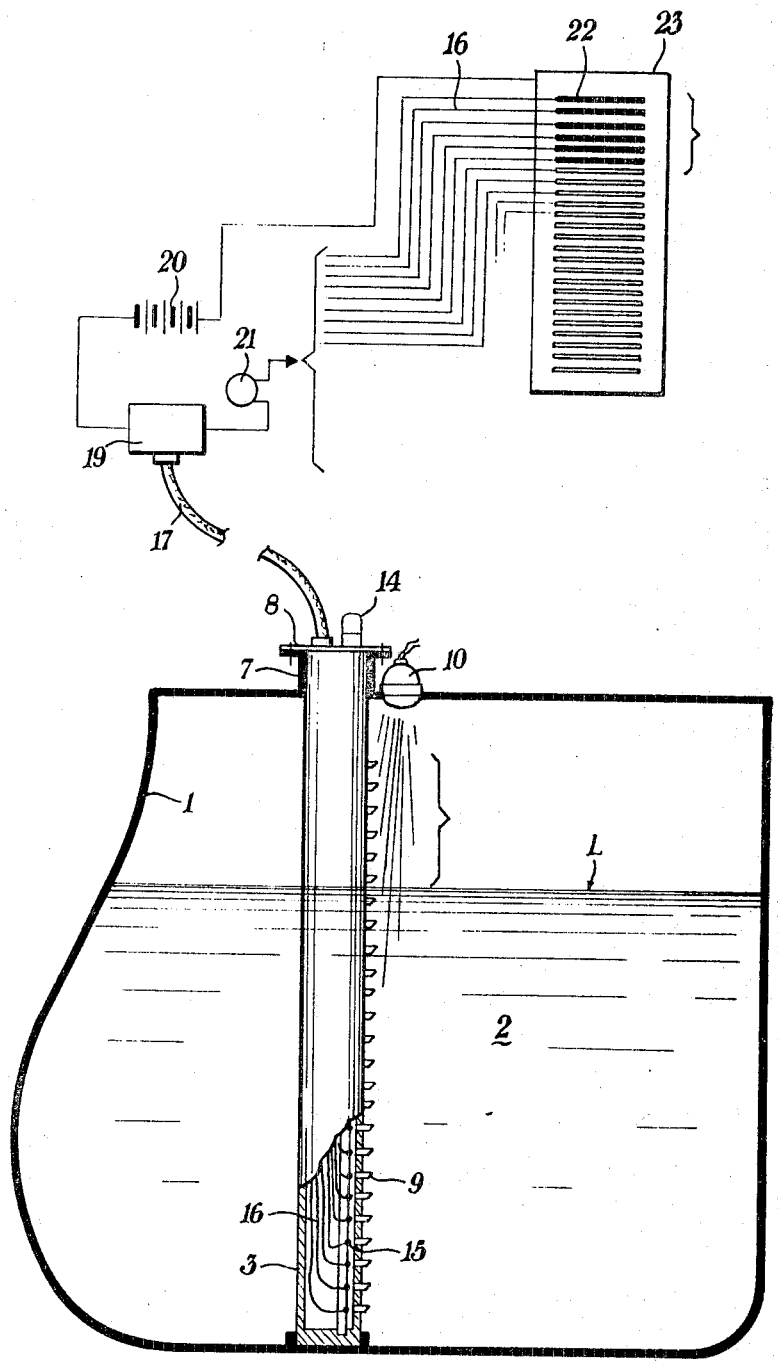
FIG. 1 is a partially cross-sectional diagrammatic view of the device according to this invention.
Figure 2:
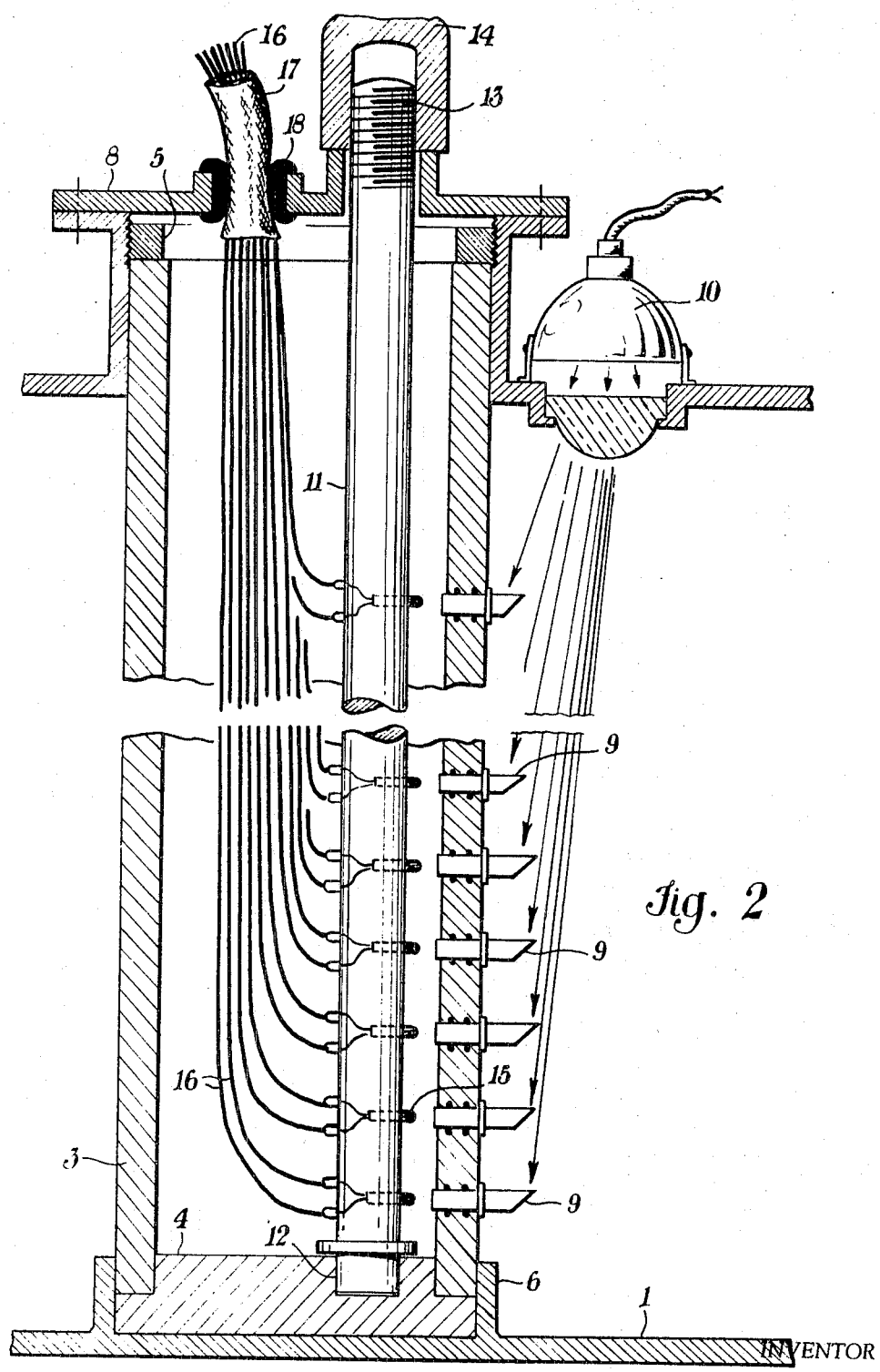
FIG. 2 shows a detail of FIG. 1, in an enlarged scale.

With reference to FIGS. 1 and 2, the numeral reference 1 denotes a tank having any shape, and containing a liquid 2.

This invention provides a probe 3, consisting of a strong cylindrical body, hermetically sealed by the bottom 4 and by the cap 5. The probe 3 is received within the base recess 6 and in the dome 7 sealingly closed by the cover 8.

On the probe 3 are mounted at prefixed intervals, the optical reflection prisms 9 simultaneously and uniformly illuminated by the luminous source 10 located on one wall of the tank 1 or at any suitable point. Inside the probe 3 a pipe 11 is mounted with its base fit into the seat 12 and its threaded top 13 sealingly tightened by the cap 14 allowing the removal thereof without requiring the emptying of the tank. Within the pipe 11 there is mounted a set of photo cells 15, mounted in front of the internal ends of the prisms 9. From the photocells 15 originate the pairs of conductors 16 which are collected in the cable 17 sealingly tightened by the packing 18.

The cable 17 (FIG. 1) leads to a signal amplifier 19, if the case may be, fed by the battery 20 or by any other suitable electric power source. From the signal amplifier 19, through a branching off element 21 the various conductors 16 are connected to a set of electro-luminescent panels 22 carried by a board 23.

The operation occurs as follows: the prisms 9, non intercepted by the liquid 2 will transmit the light to the associated photocells 15 causing the corresponding sectors 22 of the board 23 to be switched on or off according to the position of the level L inside the tank. This result as the light reflected by each prism will be maximum when the prism is not intercepted by the liquid and minimum when the prism is dipped into the liquid, due to the change of the refractive index occurring when the prism is immersed. Said change will be in fact transduced into an indication of the board or metering instrument.

Thus on the board 23 a visive indication of the level of the liquid within the tank will be obtained; of course the board 23 is merely indicative, as a graduated scale instrument, or one or more lamps, or a dial reproducing in scale the shape of the tank can be substituted therefor. It must be remarked, the advantage offered by the board 23 which can be located at any location, also remote from the tank 1.

Figure 3:
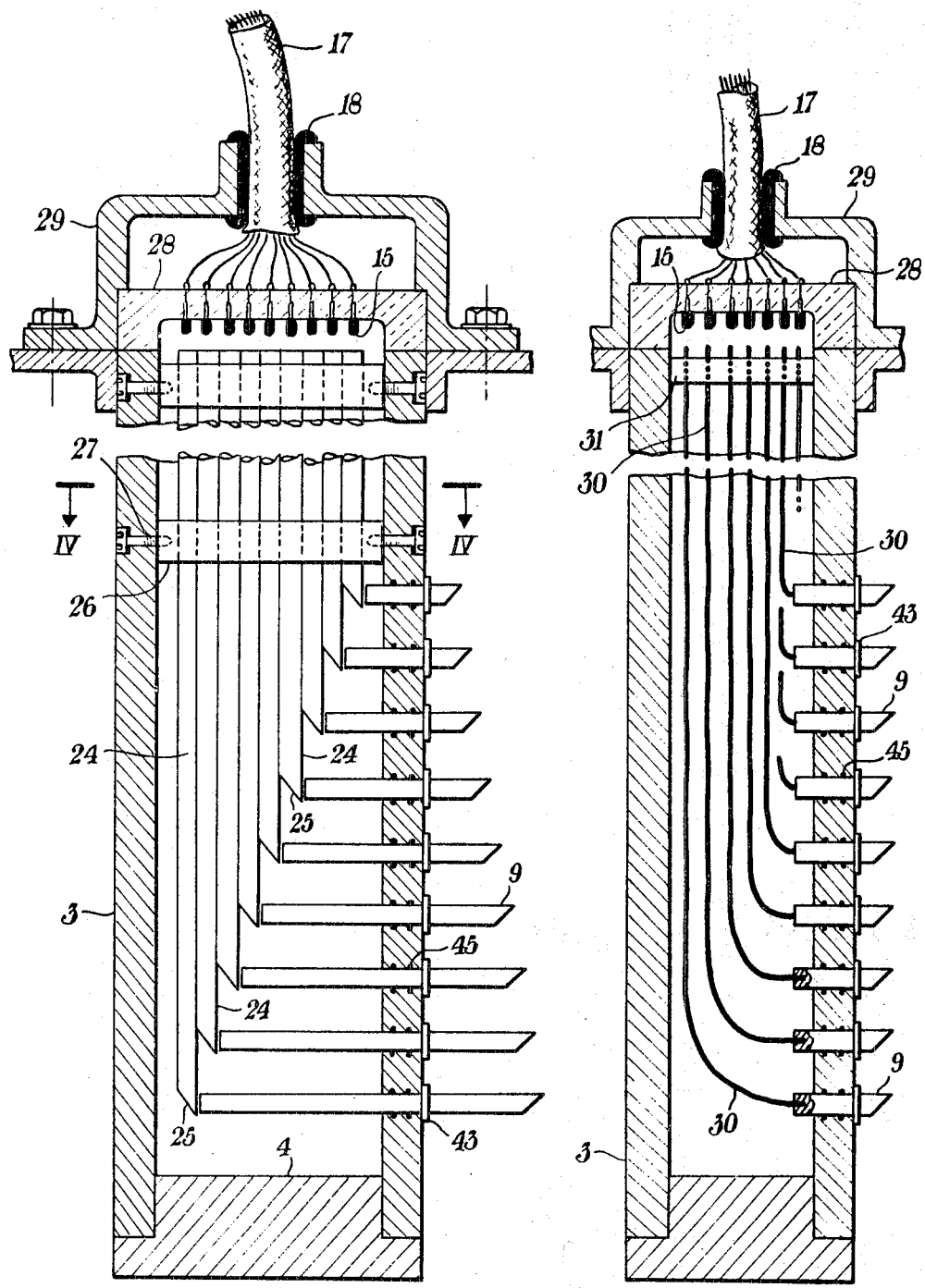
FIG. 3 is a view similar to FIG. 1, showing a second embodiment.
Figure 4:
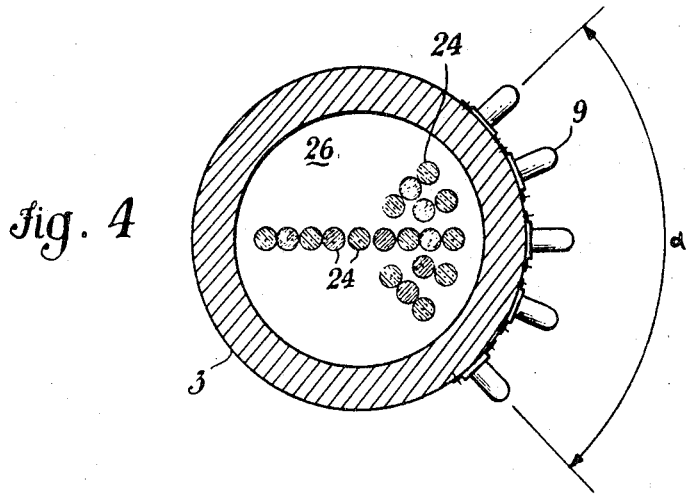
FIG. 4 is a cross-sectional view taken along the plane IV—IV of FIG. 3.

In FIGS. 3 and 4, the prisms 9 are associated to a set of rods 24, made of transparent material, carrying at their lower ends a prismatic reflecting face 25.

In order to consent the mounting in the probe 3 of a sufficient number of rods 24, the prisms 9 can be angularly staggered as shown in FIG. 4, while, for obtaining an uniform illumination of said prisms, the projection of the prisms from the probe 3 can be differentiated as shown in FIG. 3.

The rods 24 are received within discs 26 located inside the probe 3 and held by the screws 27 provided with sealing packings. To the upper ends of the rods 24, a corresponding set of photocells 15 already described, is faced, carried by the disc 28 sealingly tightened by the cover 29.

In FIG. 5, the prisms 9 are directly connected to a filamentary material 30, suitable to transmit the light also along a curvilinear path, by for concision will be called hereinafter a "light pipe."

The unit of the light pipes 30 leads to a disc 31, and the light outcoming from the upper end of each light pipe 30 is felt by a photocell 15.

In the variant shown in FIG. 6, in front of the upper ends of the light pipes 30, instead of the photocells 15, an illuminometer or luxmeter 32 is mounted, which is sensitive to the changes of light intensity of the various light pipes 30 and transmits a signal which changes with the change of the level; this signal is sent to a processing device 33 which transmits the signal itself in its suitable form to an indicating instrument 34 or to another means of visive display.

The probe 3 can be made either in a single piece, or in more segments, as shown in FIGS. 6 and 7. In this case the various segments are provided with circumferential slots into which an hermetical seal packing 35 is contained and are held by the ties 36 the ends of which are anchored to the terminal plates 37.

Also the various light pipes 30 are divided in the junction zones, and are connected by the sockets 38 and 39, carrying the male and female elements 40 and 41, respectively.

Figure 8:
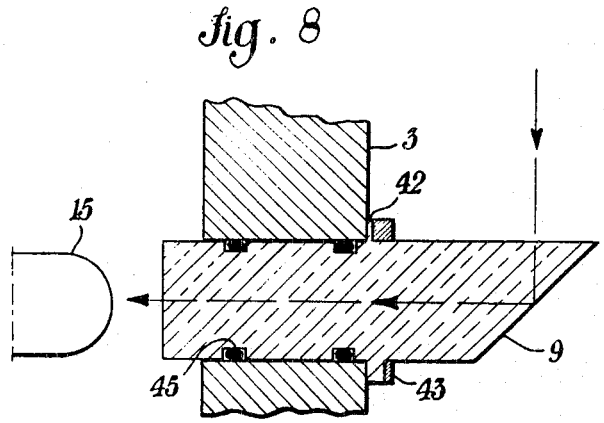
FIGS. 8 and 9 show the detail of the mounting of the reflex element on the hermetically sealed probe, in cross-sectional view and in perspective view, respectively.
Figure 9:
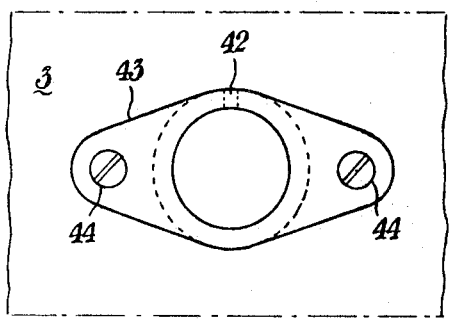

For the exact positioning of the prisms 9 on the probe 3 (FIGS. 8 and 9) the prisms are provided with a projecting member or a dowel element 42 which enters into a corresponding recess provided in the fastening collar 43 which will be mounted by means of the screws 44. The hermetic seal is given by the annular packings 45 applied to the prism body, as shown in FIG. 8, or located within seats provided in the probe 3.

The light source 10, which in the drawings is shown in the upper part of the tank, can be located at any point, for instance in the bottom of the tank. In this case, of course, the prisms must be mounted with their reflecting face upwards turned, in order to receive the light coming from the surface of the liquid.

As to the nature of the light of the source 10, besides the common spectrum light (incandescence light or fluorescence light) it is possible to use conveniently a light the wave length of which is located in the ultraviolet or infrared band. Thus, it will be enhanced the principle on which this invention is grounded, using, of course, photocells or luxmeters sensitive to said wave length (ultraviolet or infrared, respectively).

It is also to be remarked that the prisms 9 can be replaced by a simple transparent and optically conductor body, projecting from the probe 3 and the end of which has a shape whatsoever. The amount of light thus felt will still be sufficient for detection.

The present invention has been described in different preferred embodiments, it being understood that constructive changes might be practically adopted without departing from the scope of the present industrial privilege.

Having thus described the present invention, what is claimed is:

1. A device for an outside display of the level in a tank, particularly for inflammable liquids, comprising in combination a liquid-tight cylindrical hollow element secured at its lower end to the bottom of the tank and projecting at its upper end from the top of said tank, a plurality of light transmitting elements arranged at vertical intervals within the side wall of said cylindrical elements projecting both into said tank and said cylindrical element, light means arranged on the top of said tank sending a light beam onto said light transmitting elements, a plurality of feeler elements arranged within said cylindrical element each for one optical element to detect the light changes on said optical elements in dependance on the liquid level in said tank, and means arranged outside said tank coupled to said feeler elements for transducing the light changes on said light transmitting elements into a visible display corresponding to the liquid levels in said tank.

2. A device as claimed in claim 1, wherein said light transmitting elements comprise each a bar-shaped prism having the end face projecting into said tank slanting toward the tank bottom and the inner end being coupled with one of said feeler elements.

3. A device as claimed in claim 2, wherein between said prism and said feeler element a further light transmitting element is arranged within said cylindrical element.

4. A device as claimed in claim 3, wherein said further light transmitting element comprises a vertical bar-shaped prism.

5. A device as claimed in claim 3, wherein said further light transmitting element comprises a light pipe formed by light transmitting filamentary material having one end embedded into the inner end of said bar-shaped prism.

6. A device as claimed in claim 1, wherein said feeler elements comprises each a photocell cooperating with the corresponding light transmitting element, a level indicating board being provided for visibly indicating signals received from said photocells.

References Cited

UNITED STATES PATENTS

| 3,005,345 | 10/1961 | Kaufman et al. | 73—327 |
| 3,272,174 | 9/1966 | Priponic | 73—293 |
| 3,358,507 | 12/1967 | Montgomery | 73—290 |
| 3,065,354 | 11/1962 | Bird | 73—293X |
| 3,120,125 | 2/1964 | Vasel | 73—293 |

S. CLEMENT SWISHER, Primary Examiner